(No Model.) 6 Sheets—Sheet 1.
W. E. CROSSBY & A. CAREY.
MACHINE FOR DIGGING LAND.

No. 262,377. Patented Aug. 8, 1882.

Witnesses.

Inventor
W. E. Crossby
Arthur Carey (No Model.) 6 Sheets—Sheet 2.
W. E. CROSSBY & A. CAREY.
MACHINE FOR DIGGING LAND.

No. 262,377. Patented Aug. 8, 1882.

(No Model.) 6 Sheets—Sheet 3.
W. E. CROSSBY & A. CAREY.
MACHINE FOR DIGGING LAND.
No. 262,377. Patented Aug. 8, 1882.
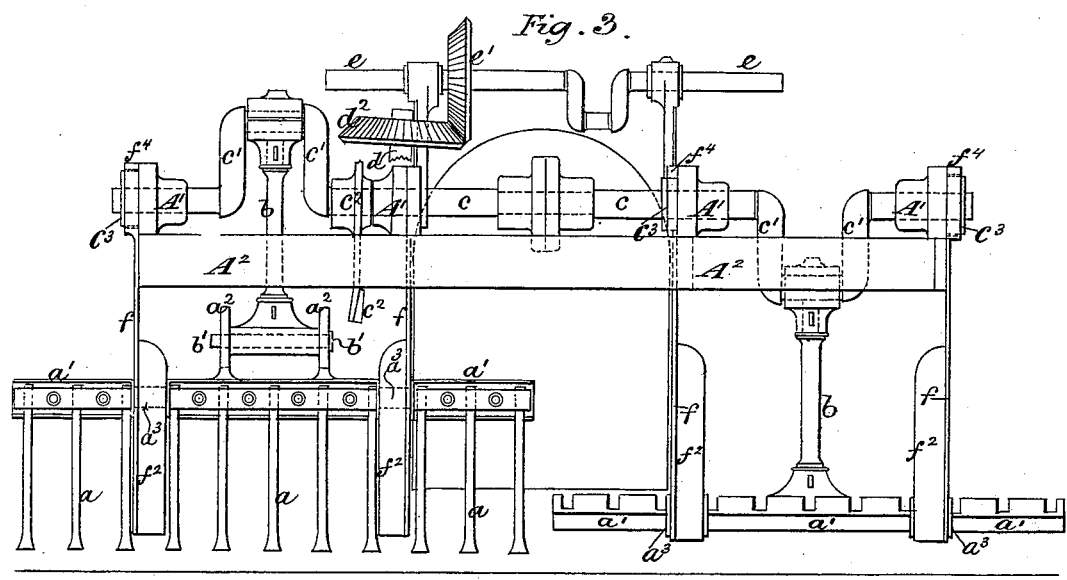
Fig. 3.
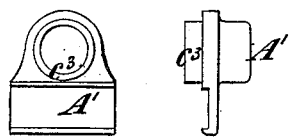
Fig. 5.
Fig. 6.
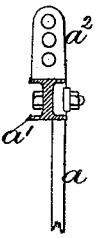
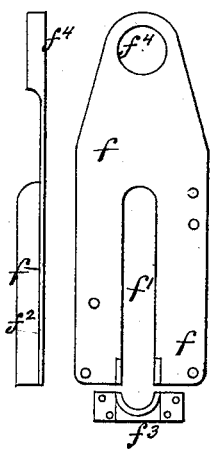
Fig. 4.
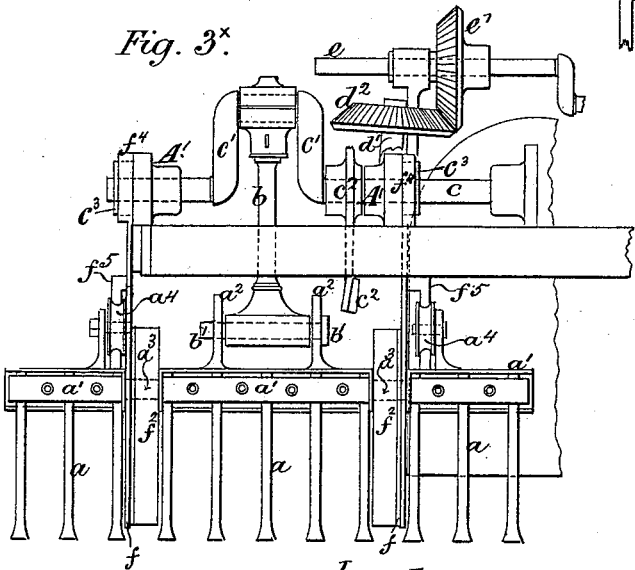
Fig. 3ˣ.
Witnesses.
Inventor
W. E. Crossby,
Archer Carey

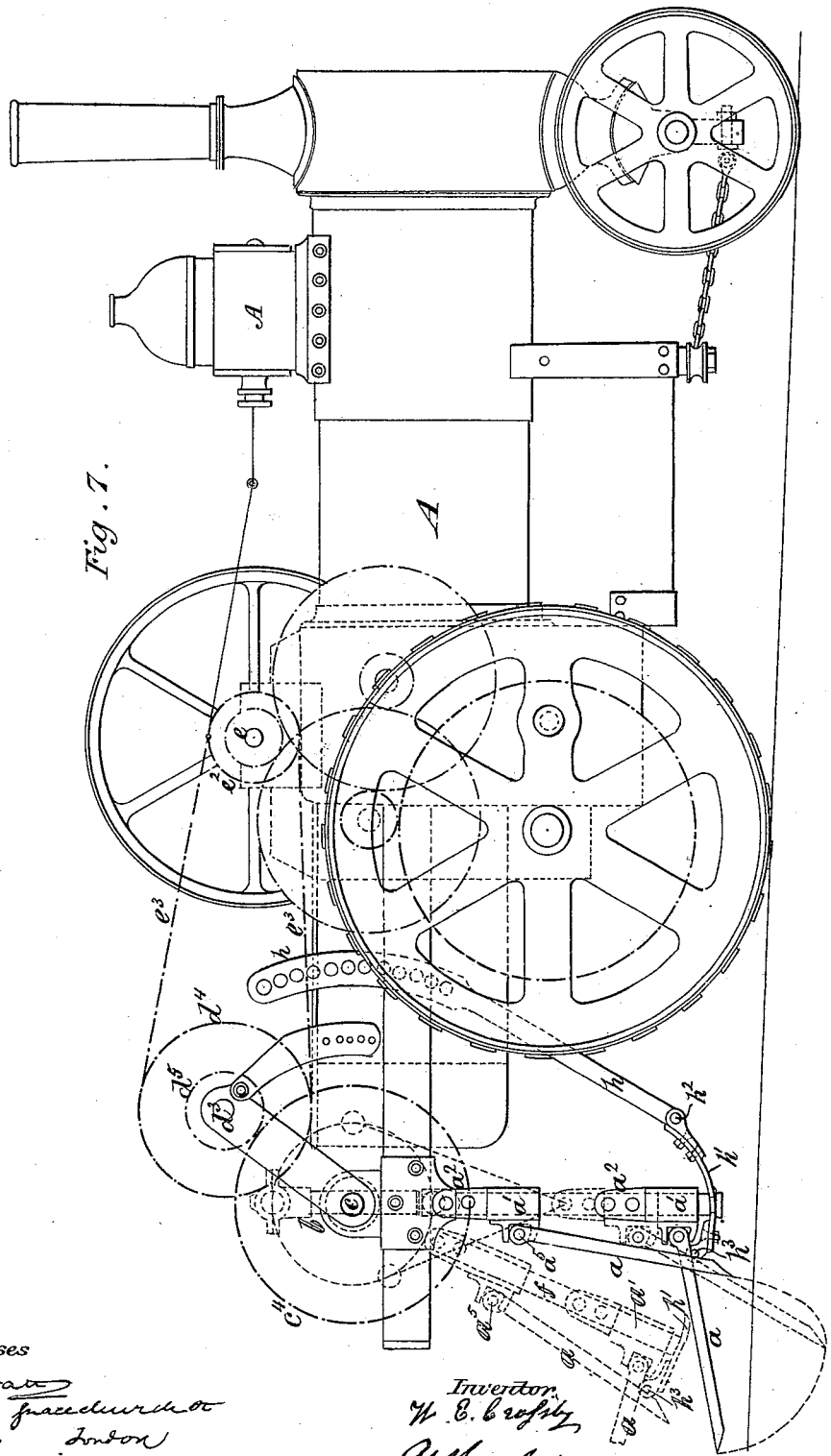

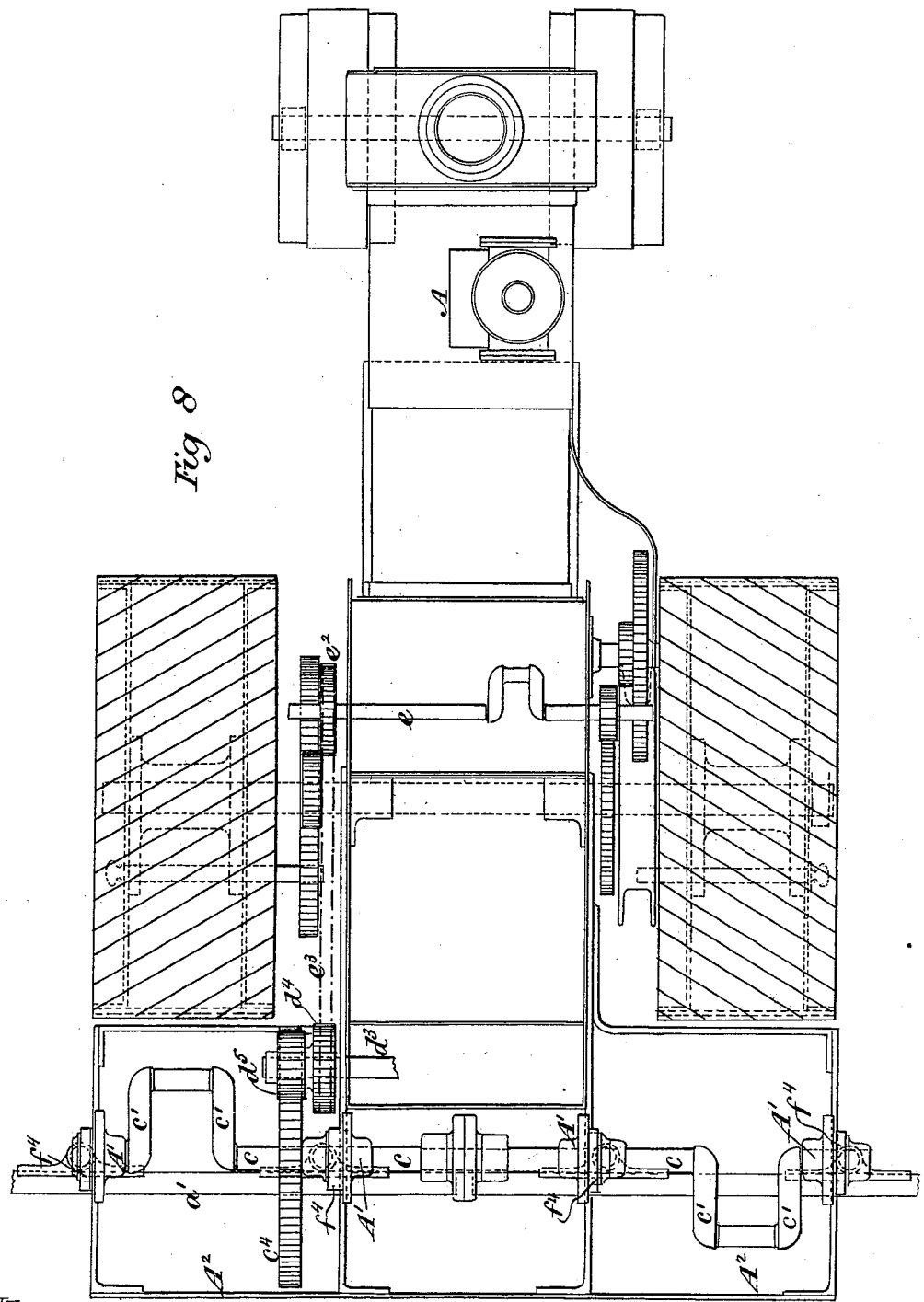

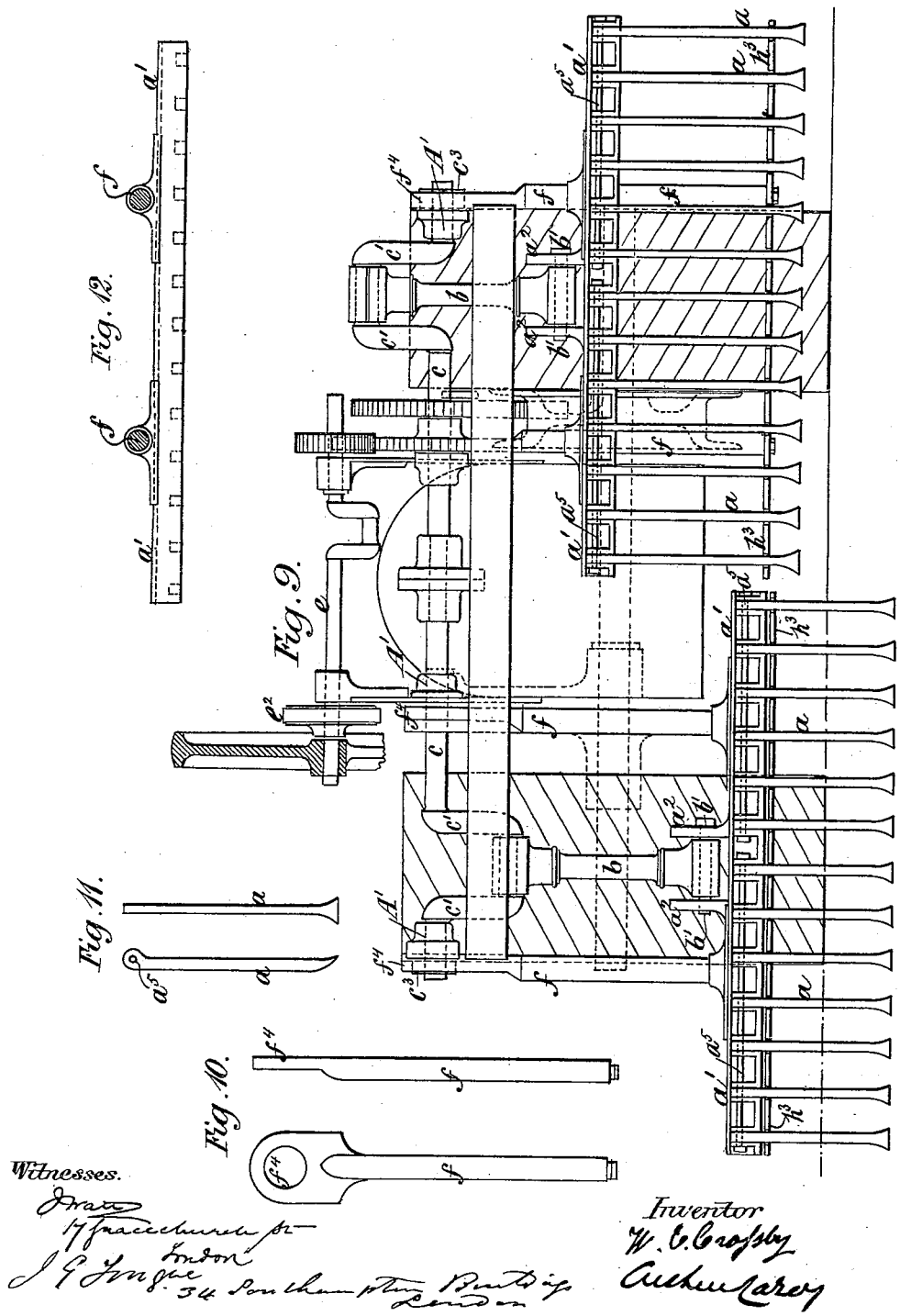

UNITED STATES PATENT OFFICE.

WILLIAM E. CROSSBY, OF CHELMSFORD, AND ARTHUR CAREY, OF ROCHFORD, COUNTY OF ESSEX, ENGLAND.

MACHINE FOR DIGGING LAND.

SPECIFICATION forming part of Letters Patent No. 262,377, dated August 8, 1882.

Application filed March 11, 1882. (No model.) Patented in England May 24, 1881, No. 2,279, and in France November 29, 1881, No. 134,092.

*To all whom it may concern:*

Be it known that we, WILLIAM EDMUND CROSSBY, of Chelmsford, in the county of Essex, England, and ARTHUR CAREY, of the firm of Carey, Stilwell & Birch, agricultural engineers, of Rochford, in the county of Essex, England, have invented certain new and useful Improvements in Machinery for Digging Land, (for which we have received Letters Patent in Great Britain, No. 2,279, dated 24th May, 1881, and in France, No. 134,092, dated 29th November, 1881,) of which the following is a specification.

This invention relates to machinery for digging land to prepare it for cultivation, which is capable of being operated by a traction-engine, by a wire rope driven by a stationary engine, or by manual labor.

This invention consists essentially in the combination, with a series or number of spades, forks, tines, or digging instruments, of a bar or frame carrying the same, stationary guides for said bar or frame, and mechanism, which may consist of a crank-shaft and suitable connections, for reciprocating said bar or frame and its spades, forks, or tines upward and downward to force the latter into the earth, and for oscillating or rocking the bar or frame or the spades, forks, or tines, at or near the termination of their descent only, to throw up the earth by the said spades, forks, or tines with a quick movement, as more fully hereinafter described.

Figure 1:
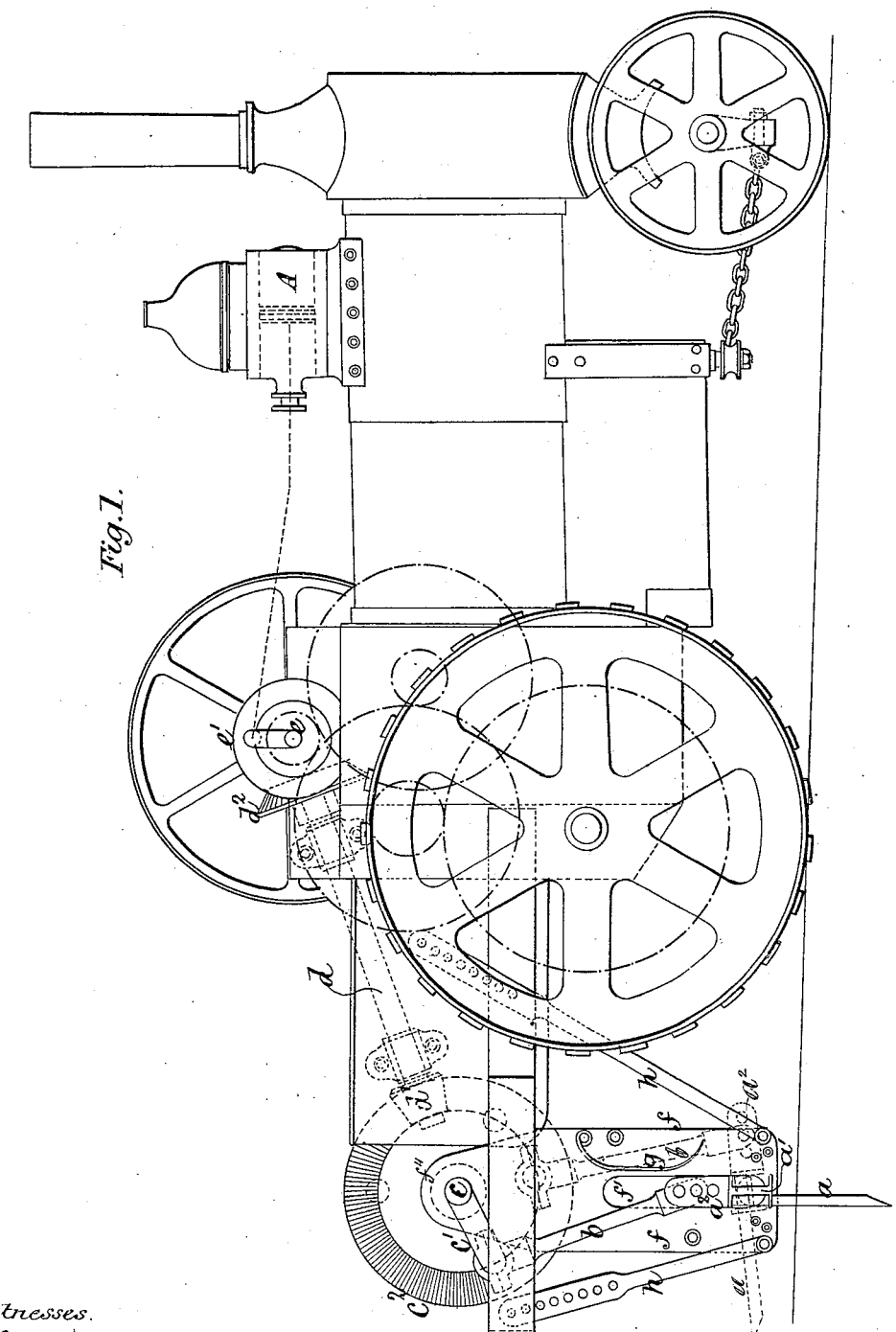
Figure 2:
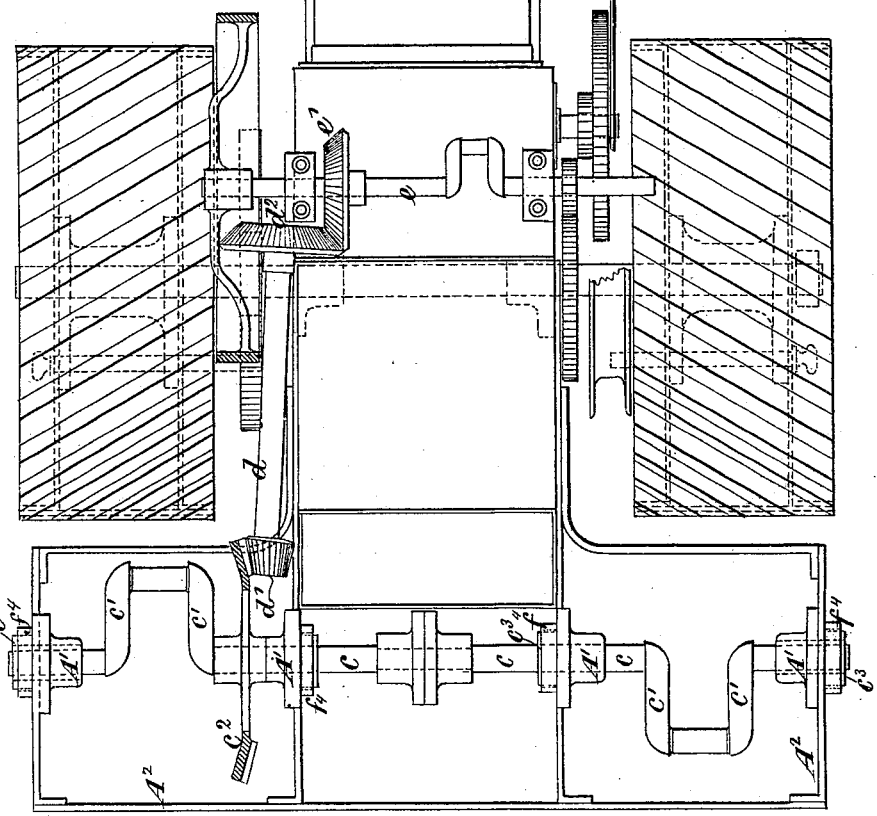

In the accompanying drawings, Figure 1 represents a side elevation of a traction-engine and a digging-machine embodying our invention and carried thereby. Fig. 2 represents a plan of the engine and machine. Fig. 3 represents an end elevation of the digging-machine. Fig. 3* represents an end elevation of a portion of the digging-machine slightly modified. Fig. 4 represents a side and edge view of one of the guides in which the bar carrying the spades, forks, or tines is reciprocated. Fig. 5 represents a face and side view of a bearing which supports the crank-shaft. Fig. 6 represents a side view of the bar or frame carrying the spades, forks, or tines, and a transverse section of said bar or frame. Fig. 7 represents a side elevation of a traction-engine and a digging-machine of modified construction, also embodying our invention. Fig. 8 represents a plan of the engine and machine shown in Fig. 7. Fig. 9 represents an end elevation of the machine shown in Fig. 7. Fig. 10 represents a side an edge view of one of the guides for the reciprocating bar or frame of the machine shown in Fig. 7. Fig. 11 represents a side and an edge view of one of the spades or tines thereof, and Fig. 12 represents a plan of the bar or frame and its guide-rods.

Similar letters of reference designate corresponding parts in all the figures.

We will first describe the machine shown in Figs. 1 to 6, inclusive.

$a$ designates the spades, tines, or digging implements, and $a'$ designates a horizontal bar or frame in which a number of them are secured, as shown in Figs. 3 and 6. Each bar or frame $a'$ and its attached spades or tines $a$ constitute a set, and the machine may have one set or two sets, as here represented, or more than two sets, if required. The bars $a'$ are provided with arms $a^2$, which extend upward, and $b$ designates connecting-rods, which are connected by pins $b'$ to said arms $a^2$. The said arms may each have several holes, as clearly shown in Fig. 6, through any one of which the pin $b'$ is inserted.

$c$ designates a shaft provided with cranks $c'$, which may be set at an angle to each other when two sets of digging spades or tines are employed, and by which the connecting-rods $b$ are operated.

A designates the traction-engine which carries the digging-machine, and $e$ designates the crank-shaft thereof. In this example of our invention motion is transmitted from the engine crank-shaft $e$ to the shaft $c$ by means of a counter-shaft, $d$, carrying a bevel-pinion, $d'$, which engages with a bevel-wheel, $c^2$, on the shaft $c$, and a bevel-wheel, $d^2$, which engages with a corresponding wheel, $e'$, on the engine crank-shaft $e$. The crank-shaft $c$ is mounted in bearings $A'$, attached to the frame $A^2$ of the machine, and the form of said bearings is shown most clearly in Fig. 5, each being provided with a hub or projection, $c^3$.

The bar $a'$ is provided with two round journals, $a^3$, and these journals are adapted to work in stationary guides or hangers $f$, each of which has a slot, $f'$, for receiving the journal, and is provided with flanges $f^2$, affording a bearing-surface, as best shown in Fig. 4. At the lower end of each guide $f$ is a half-round cap, $f^3$, which retains the journals $a^3$ therein. Each guide $f$ has at its upper end an eye, $f^4$, which fits and is adapted to swing on the hub $c^3$ of one of the bearings $A'$, and the guides are held in place at their lower ends by braces or stays $h$, which are provided with several holes at their upper ends, as shown in Fig. 1, so as to afford provision for retaining the guides $f$ at any inclination desired, to cause the spades or tines $a$ to penetrate the ground at any desired angle.

$g$ designates a spring fixed to each guide $f$, as shown in Fig. 1, and serving to guide the bar $a'$ as it turns upon its journals $a^3$ in its up and down movements. The bar $a'$ and its attached spades or tines $a$ may be also guided, if desired, by means of geared friction-rollers $a^4$, attached to the bar $a'$ and running upon guides $f^5$, as shown in Fig. 3*. As the bar $a'$ is moved downward by the action of the connecting-rods $b$ the tines or spades $a$ are forced directly downward into the ground until the journals $a^3$ are arrested by the caps $f^3$ at the bottom of the guides $f$. The continued movement of the connecting-rods $b$, acting upon the arms $a^2$ of the bar $a'$, causes the bar to make a partial revolution in the bearings formed by said caps, and thereby turns the spades or tines $a$ up suddenly into the position shown in Fig. 1 in dotted outline, thereby throwing up the earth and thoroughly loosening it up. The upward movement of the connecting-rods $b$ causes the bar $a'$ and spades or tines $a$ to turn in the opposite direction, and thereby returns the latter into a nearly upright position, ready to be forced again into the earth on the next downward movement of the bar $a'$, the traction-engine in the meantime having moved a sufficient distance ahead to enable the spades or tines to take into the solid earth.

We will now describe the modification of our invention shown in Figs. 7 to 12, inclusive.

$a$ designates the spades or tines, and $a'$ the bar whereby they are carried. The said spades or tines are not rigidly fixed in the bar, as in the machine above described, but are hinged by pins or pintles $a^5$, as clearly shown in Fig. 7. The guides $f$ are not like those previously described, but consist simply of straight rods, the form of which is shown clearly in Fig. 10, and the bar $a'$ is provided with lugs, which work upon them, as shown in Fig. 12. The bar $a'$ is reciprocated by means of connecting-rods $b$, connected with its arm $a^2$ by pins $b'$, as before described, and the crank-shaft $c$, which is provided with cranks $c'$, is supported in bearings $A'$, like those before described. The guide-rods $f$ have eyes $f^4$, which fit upon the hubs $c^3$ of the bearings $A'$, and the said guides are secured at their lower ends to arms $h'$, which are hinged at $h^2$ to stays or braces $h$, very similar to those shown in the preceding figures. The bar $a'$ has simply a reciprocating movement, and the spades or tines $a$ hang over a bar or rod, $h^3$, held stationary in the arms $h'$, as clearly shown in Fig. 7. When the bar $a'$ is in its highest position the spades or tines hang nearly vertically; but as it approaches its lowest position the said spades or tines are swung or turned suddenly outward and upward by the rod or bar $h^3$ into the position in which one set of spades or tines are shown in Fig. 7, and by them the earth is loosened and thrown up. The crank-shaft $c$ is not rotated by the mechanism shown in the preceding figures, but by a different mechanism, which, however, forms no part of our invention.

$A$ designates the traction-engine, and $e$ the crank-shaft thereof. Upon the engine crank-shaft $e$ is a chain or sprocket-wheel, $e^2$, and $d^3$ designates a counter-shaft, carrying a similar wheel, $d^4$, which is driven by a chain, $e^3$, from the wheel $e^2$. The counter-shaft $d^3$ likewise has upon it a spur-wheel, $d^5$, which engages with a spur-wheel, $c^4$, upon the crank-shaft $c$. This driving mechanism is best shown in Fig. 8.

When the traction-engine is to be moved or run from place to place the bar $a'$ and its attached spades or tines may be swung outward and raised into the position shown in dotted lines in Fig. 7 by altering the connection of the traces or stays $h$ with the frame-work of the machine, the number of holes in the upper end of said braces or stays affording provision for such adjustment.

Although the mechanism here shown for operating the spades or tines $a$ is very desirable, it is evident that it may be considerably varied without departing from the spirit of our invention.

We are aware that machines have been made in which a number of spades, tines, or digging implements are operated by cranks, and owing to the varying angles of the cranks the spades, tines, or implements would of course enter and leave the ground at different angles. Our machine differs from those heretofore made, in that we provide straight stationary guides wherein our frame or bar which carries the digging implements is reciprocated, whereby the implements are caused to move in straight lines during the principal portion of their descent, and to so enter the ground, and we provide means for swinging or throwing the implements positively and quickly upward and outward near the termination of their descent.

What we claim as our invention, and desire to secure by Letters Patent, is—

1. The combination, with the bar or frame and its attached spades, tines, or digging implements, of mechanism for reciprocating said bar or frame upward and downward, stationary guides wherein said bar or frame is guided during its ascent and descent, thereby causing the spades, tines, or implements to enter the ground in straight lines, and means for turning or swinging said spades, tines, or implements upward and outward quickly as said bar or frame approaches the end of its downward movement, substantially as and for the purpose specified.

2. The combination, with the bar or frame and its attached spades, tines, or implements, of mechanism for reciprocating said bar upward and downward, and guides for said bar adjustable to different inclinations, substantially as and for the purpose specified.

3. The combination, with the bar or frame and its attached spades, tines, or implements, of the crank-shaft and rod for reciprocating said bar, and guides for said bar or frame, provided at their upper ends with eyes, whereby they are suspended concentrically to said crank-shaft, substantially as specified.

4. The combination, with the bar or frame provided with journals, and its rigidly-attached spades, tines, or implements, of guides for said journals, wherein the bar or frame may turn, and a crank-shaft and connecting-rod connected with said bar or frame for reciprocating it upward and downward and for turning it, substantially as and for the purpose specified.

5. The combination of the spades or tines $a$, the bar $a'$, provided with journals $a^3$, the slotted guides $f$, provided with caps $f^3$, and the crank-shaft $c$ and connecting-rod $b$, substantially as specified.

W. E. CROSSBY.
ARTHUR CAREY.

Witnesses:
J. WATT,
17 *Gracechurch Street, London.*
J. G. LONGUER,
34 *Southampton Building, London.*